United States Patent [19]

Kock

[11] 4,092,996

[45] June 6, 1978

[54] WATER DISPENSING APPARATUS

[76] Inventor: Arne Karl Kock, Swedenborgsgatan 5B, Stockholm, Sweden

[21] Appl. No.: 668,243

[22] Filed: Mar. 18, 1976

[30] Foreign Application Priority Data

Mar. 21, 1975 Sweden ................................ 7503242

[51] Int. Cl.² .............................................. B05B 3/18
[52] U.S. Cl. .................................... 137/344; 137/599; 137/615; 239/281
[58] Field of Search ....................... 137/344, 615, 599; 239/212, 281; 141/388

[56] References Cited

U.S. PATENT DOCUMENTS

| | | | |
|---|---|---|---|
| 2,948,306 | 8/1960 | Kuraeff | 137/615 UX |
| 3,281,080 | 10/1966 | Hogg | 137/344 X |
| 3,409,046 | 11/1968 | Means | 137/615 |
| 3,661,170 | 5/1972 | Mitchell | 141/388 X |
| 3,700,833 | 10/1972 | Behme | 137/615 X |
| 3,721,260 | 3/1973 | Stahmer | 137/615 X |
| 3,825,045 | 7/1974 | Bloomquist | 137/615 X |
| 3,942,554 | 3/1976 | Werner et al. | 137/615 |

Primary Examiner—Gerald A. Michalsky

Attorney, Agent, or Firm—Birch, Stewart, Kolasch & Birch

[57] ABSTRACT

This apparatus is designed for transferring fluid from a fluid source to a fluid consumer. The system includes two substantially identical, extendable and collapsable pipe systems each of which includes a plurality of substantially rigid pipes and a plurality of pipe coupling devices. The pipe coupling devices are arranged to pivotally connect the ends of the pipes together so that fluid may flow from pipe to pipe through the pipe coupling devices. A plurality of holding devices are arranged to hold a specific portion of a pipe in one pipe system in a pivotal spaced apart relationship to a corresponding portion of a pipe in the other pipe system. Fluid from the flow source communicates with one end of each of the pipe systems through the plurality of pipes, through the plurality of pipe coupling devices to a fluid consumer or fluid distributor. This apparatus also includes a plurality of supporting devices each arranged for carrying the pipe systems above a surface. The supporting devices are connected to the pipe systems at the holding devices and include a portion for engaging the surface.

4 Claims, 8 Drawing Figures

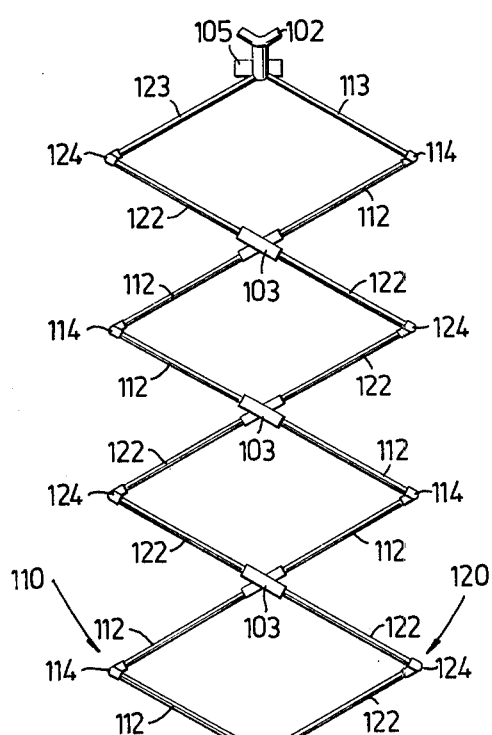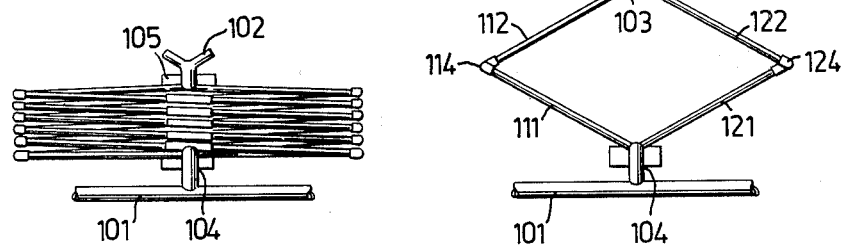

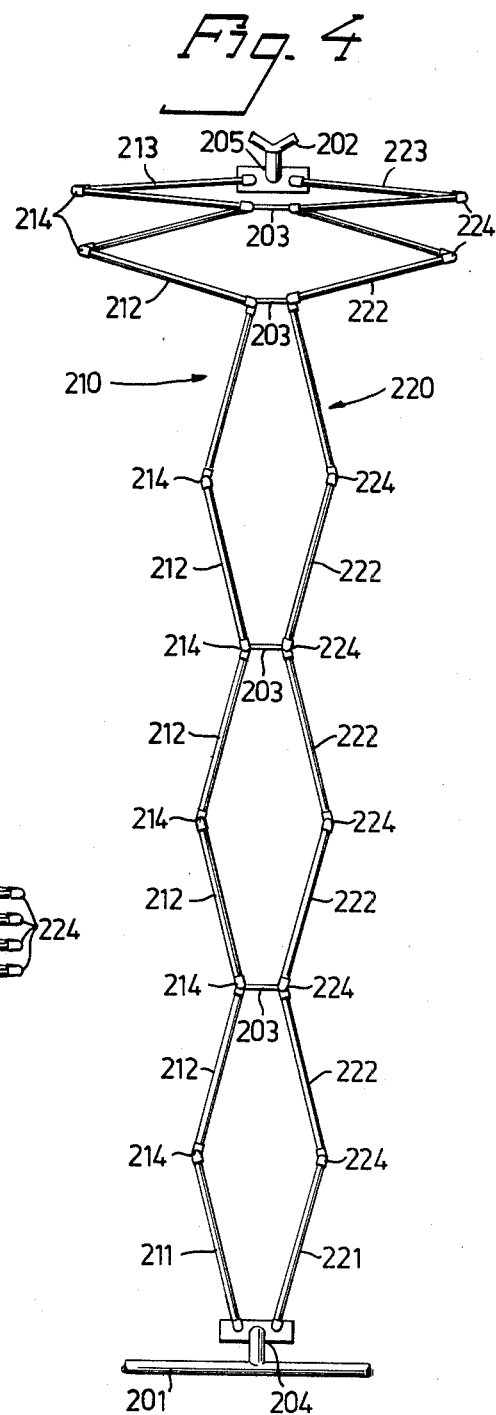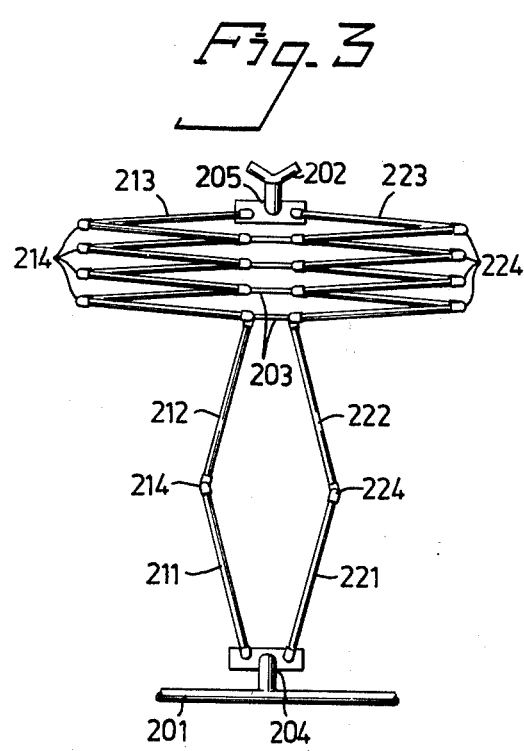

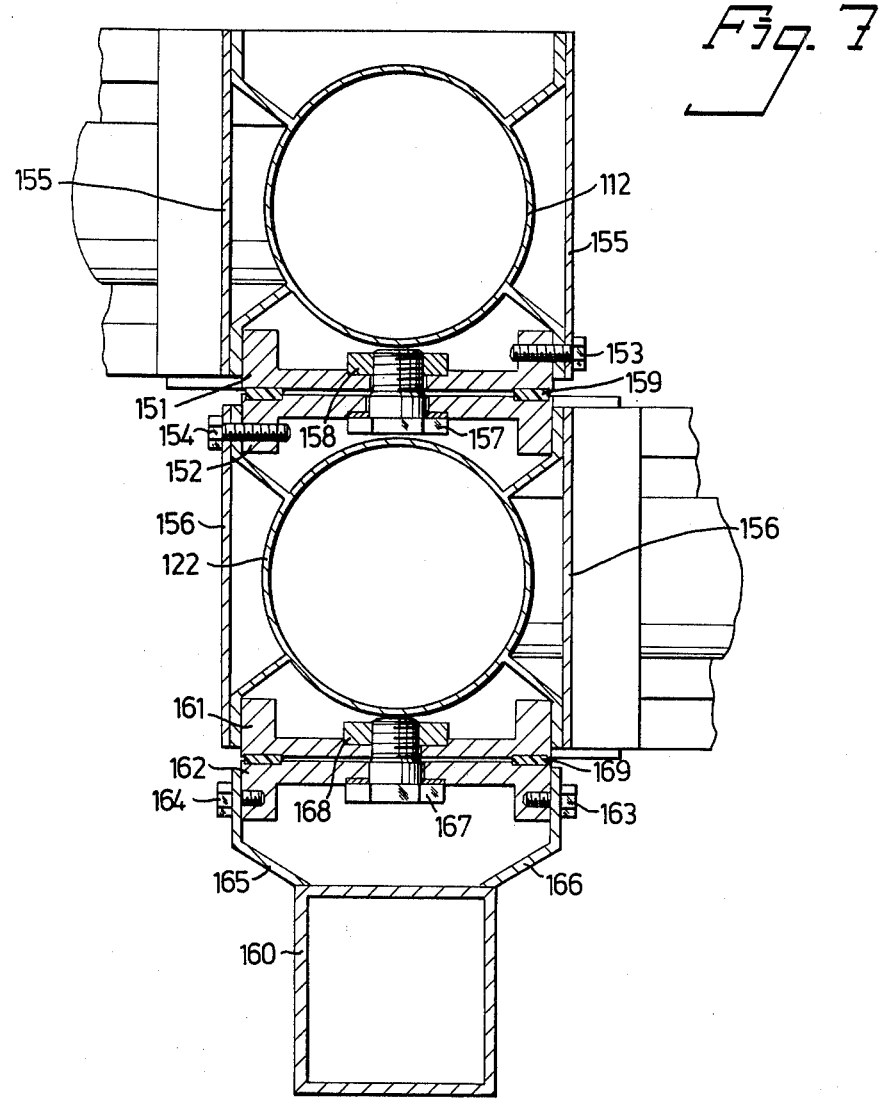

WATER DISPENSING APPARATUS

BACKGROUND OF THE INVENTION

The present invention relates to apparatus which are adapted to conduct water from a water source to a water consumer, said apparatus being movable relative to said source. More particularly, although not exclusively, the present invention relates to a watering apparatus which is suitable for watering large areas of ground.

Developments within the farming industry have resulted in increased requirements for the artificial watering of agricultural ground. A number of proposals have been submitted concerning the artificial watering of relatively large areas of ground using water sprays.

One such proposal suggests the use of a large number of spray devices mounted on a network of pipes. This network may be permanently installed or only temporarily installed. Although the network of pipes which is permanently installed is always available when watering is necessary, the installation and maintenance of such network is expensive. A main disadvantage with the temporary network of pipes is the disassembling and reassembling of the network.

Other proposals incorporate tractor-driven or tractor-carried pipes or hoses provided with water sprays. In addition self-propelling apparatus have been proposed, in which the water pipes are carried on a plurality of sequentially arranged wheels which are arranged to move parallel to a main water-pipe or circularly around a water hydrant which may be a permanently affixed or moveably arranged.

The network of pipes or hoses which is carried by or driven by tractors is expensive to operate. Also since the pipes or hoses are pulled along the ground when they are to be laid-out or drawn-in, the pipes or hoses become worn, thereby reducing their effective useful life. In addition, due to the friction against the surface of the ground, the pipes or hoses are subjected to high tension forces which tend to pull them apart. Consequently, it is necessary to limit the length of such a hose. Despite the limited length of the hose, the hose is still relatively heavy. The devices which incorporate a drum on which a hose is coiled, for transporting the same, are also heavy and difficult to move. The self-propelling devices normally require a large number of spray mechanisms and are expensive to manufacture. Further, the requirement of external power forces, such as electric motors or diesel engines in self-propelling or tractor-driven systems is a serious disadvantage.

The present invention is based on the concept of using two substantially identical, extendible and collapsible pipe-systems arranged to conduct water from a water source, for example a water main or a water hydrant, to a water-consumer, for example one or more water sprays. Each system of pipes is constructed of a number of substantially rigid pipes and a plurality of pipe-coupling devices which pivotally connect the pipes at the ends thereof in a manner to permit water to flow from pipe to pipe through the coupling devices. The system of pipes is held together by holding means and is carried above the surface of the ground by supporting means.

The use of the pipe-systems enables substantially the same flexibility as that obtained with hoses, while at the same time eliminating a number of the disadvantages encountered with hoses. One end of the respective pipe-systems is connected to a water hydrant and the other ends of said system are connected to a water spray. By extending and collapsing the pipe-systems, the water spray can be reciprocatingly moved over a surface to be watered.

In accordance with one embodiment of the invention, the pipe-systems can be provided with means for moving the systems automatically along a reciprocating path of pre-determined length. The speed at which the pipe-systems reciprocate and, also, the volume of water dispensed can be pre-set. Hence the desired quantity of watering can be obtained. This system enables watering of the ground with the required amount of water. Thus, over a period of time the ground is able to absorb the total quantity of water dispensed by the system. Previously, this has not been possible with known apparatus, especially such apparatus which employ the use of hoses. Because of the special construction and design features of the pipe-systems according to the invention, it is possible and practical to utilize the systems water pressure as this source of energy for moving the apparatus. In certain instances, this feature affords a substantial advantage in comparison with conventional apparatus driven, for example, by electric motors or diesel engines.

Since the apparatus according to the invention is moved across the surface of the ground while supported on suitably constructed movement means, plants or the like growing in the ground will suffer little damage as the apparatus passes thereover.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

So that the invention will be more readily understood and further features thereof made apparent, a number of embodiments of the invention will now be described with reference to the accompanying drawings, which are given by way of illustration only, and thus are not limitative of the present invention, in which:

FIGS. 1 and 2 show diagrammatically and in greatly simplified form a first embodiment of two joined-together pipe-systems in a substantially collapsed position and a substantially extended position, respectively.

FIGS. 3 and 4 show diagrammatically and in greatly simplified form a second embodiment of two joined-together pipe-systems in a substantially collapsed and a substantially extended position, respectively.

FIG. 7 is a diagrammatic sectional view through an embodiment of a holding device.

Figure 6:
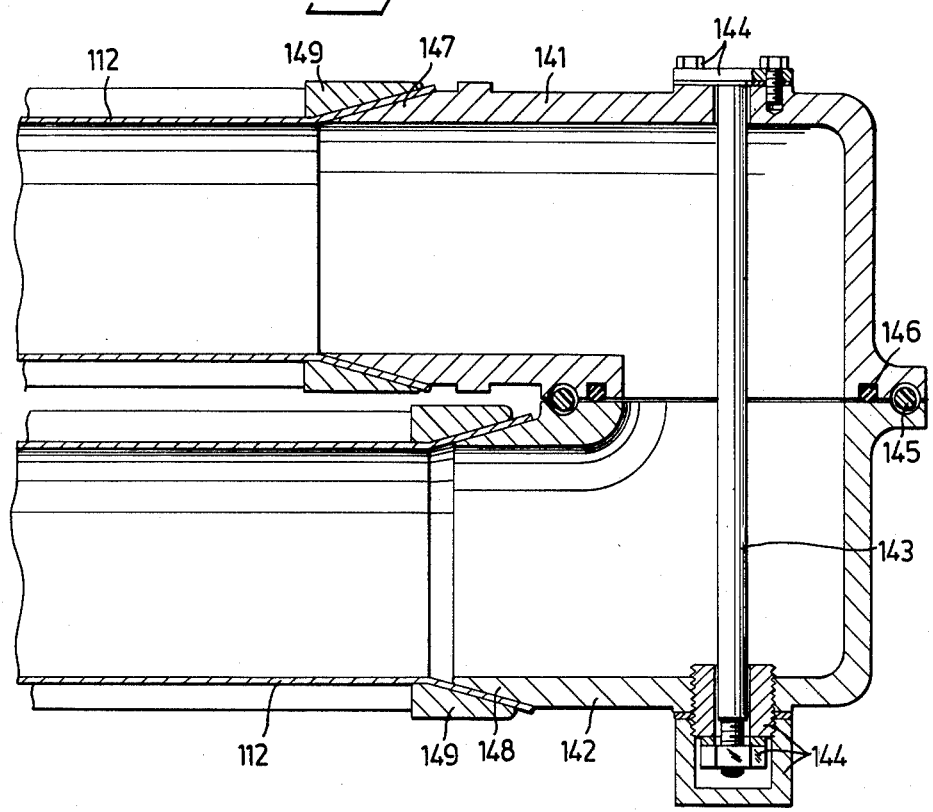
FIG. 6 is a diagrammatic sectional view through a pipe-coupling device with adjacent pipes.

In FIGS. 1 and 2 there are shown two pipe-systems 110 and 120, respectively, which are arranged to conduct water between a water source, such as the water-pipe 101, and a moveable water-consumer, such as the water-spray 102. Each system of pipes is constructed of a plurality of substantially rigid pipes which are pivotally joined at their ends by pipe-coupling devices. The pipe-coupling devices are constructed in a manner to permit water to flow from pipe to pipe through the coupling devices.

In the embodiment of FIGS. 1 and 2, the pipe-system 110 comprises pipes 111, 112 and 113 and pipe-coupling devices 114, while the other pipe-system 120 comprises pipes 121, 122 and 123 and pipe-coupling devices 124. The pipes 122 are mutually of substantially the same length and are substantially as long as the pipes 112. The pipes 111, 113, 121 and 123 have a length which is substantially half that of the pipes 112 and 122. Although not absolutely necessary for the functioning of the system, the internal cross-sectional area is substantially the same for all pipes. The pipes may be made of aluminium or some other suitable metal, or an alloy which is suitable with respect to its resistance to corrosion and mechanical stresses and strains.

The pipe-systems 110 and 120 are arranged so that each pipe 112 is centrally crossed by or crosses a pipe 122. Arranged at the points of intersection are holding means 103, each of which is arranged to hold the center portion or the center point of a pipe 112 at a distance from the center point or center portion of the crossing pipe 122.

The holding means are so constructed that the distance of the center points is greater than but of the same magnitude as the cross-sectional dimensions of the pipes. The distance of the center points is not critical but short distances are preferred. The same magnitude may in this respect be interpreted as not greater than ten times the cross-sectional dimensions.

Coupled to the water pipe 101 is a first water-supply means 104, which is arranged to conduct water from the water-pipe 101 to the pipe 111 in one pipe-system and to the pipe 121 in the other pipe-system. A second water-supply means 105 is coupled to the pipe 113 in the one pipe-system and to the pipe 123 in the other pipe-system. The purpose of the second water-supply means is to conduct water from the first system to the water-consumer, i.e. the spray 102.

The two water-supply means are located at opposite ends of the pipe-systems and one water-supply means is arranged to be moved along a straight line relative to the first water-supply means, by extending and collapsing the pipe-systems.

The advantage afforded by the use of two substantially identical systems of pipes joined together in accordance with the embodiment of FIGS. 1 and 2 over a single pipe-system such as 110, is that said movement takes place automatically along a straight line which, for example, may be perpendicular to the water-pipe 101. As a result of the provision of the holding means and their particular orientation, pivoting of the pipes relative to one another is automatically synchronized within each pipe-system itself and between the two pipe-systems.

In FIGS. 3 and 4 there is shown a pipe-system 210 and a pipe-system 220 which conduct water between a water source, such as the water-pipe 201 and a moveable water-consumer, such as the water-spray 202. In a similar manner to the embodiment of FIGS. 1 and 2, each pipe-system is constructed of a plurality of substantially rigid pipes 211, 212, 213 and 221, 222, 223 respectively, which are pivotally coupled at the ends thereof by pipe-coupling devices 214 and 224, respectively. The pipe-coupling devices may be of the same type as those used with the FIGS. 1 and 2 embodiment and are constructed so that water is able to flow from pipe to pipe through the coupling devices.

Each pipe 212 of one pipe-system has a length which is substantially the same as that of the corresponding pipe 222 in the other pipe-system. In contrast to the pipe-systems of the FIGS. 1 and 2 embodiment, the pipes 211 and 221 at one end of the respective pipe-systems and the pipes 213 and 223 at the other end of the respective pipe-systems have a length which is substantially equal to the length of the connecting pipes 212 and 222, respectively.

Similarly to the pipe-system shown in FIGS. 1 and 2, the pipe-system according to FIGS. 3 and 4 are provided with holding means 203 each of which is arranged to hold a specific portion of one pipe-system in spaced relationship to a corresponding portion of the other pipe-system. The number of holding means provided and the particular positioning of said means is, however, substantially different in the FIGS. 3 and 4 embodiment compared to that of the FIGS. 1 and 2 embodiment. Each of the holding means 203 is arranged to cooperate with each alternate pipe-coupling device 214 and 224 in respective pipe-systems and holds a pipe-coupling device 214 of one pipe-system 210 at a distance from the corresponding pipe-coupling device 224 in the other pipe-system 220, said distance being of the same magnitude as the cross-sectional dimensions of the pipes. The same magnitude may be interpreted as not smaller than one tenth of and not greater than ten times said cross-sectional dimensions.

As with the pipe-systems of the FIGS. 1 and 2 embodiment, there is provided a first water-supply means 204 adapted to conduct water from the water-pipe 201 to the pipe 211 of one pipe-system and to the pipe 221 of the other pipe-system. At the opposite side of the pipe-systems there is provided a second water-supply means 205 for conducting water from the pipe 213 of one pipe-system and the pipe 223 of the other pipe-system to a water-consumer, such as the water-spray 202.

Thus, as with the embodiment according to FIGS. 1 and 2, the two water-supply means are located at opposite ends of the pipe-systems and the other water-supply means 205 can be moved along a straight line relative to the first water-supply means 204 by extending or collapsing the pipe-systems. The advantage afforded by the provision of two identical joined-together pipe-systems in accordance with FIGS. 3 and 4 as opposed to a single pipe-system, for example 220, is that said movement is automatically effected along a straight line which, for example, may extend at right angles to the water pipe 201. As a result of the provision of the holding means and their particular orientation, rotation of the pipes relative to each other is automatically synchronized between the two pipe-systems.

One difference between the pipe-systems of the FIGS. 3 and 4 embodiment and the pipe-systems of the FIGS. 1 and 2 embodiment, resides in the movement of the pipes as the pipe-systems are extended or collapsed. With the pipe-systems according to FIGS. 1 and 2 all pipes in respective systems are pivoted or rotated synchronously, as will be apparent upon comparison of FIG. 1 which shows the systems in a practically fully collapsed position, and FIG. 2 which shows the systems in a practically fully extended position. With the pipe-systems according to FIGS. 3 and 4, on the other hand, pivoting or rotation of the pipe is only pairwise synchronized, as will be evident upon comparison of FIG. 3 which shows the pipe-systems in a practically fully collapsed position, with FIG. 4 which shows the pipe-systems in a practically fully extended position.

Figure 5:
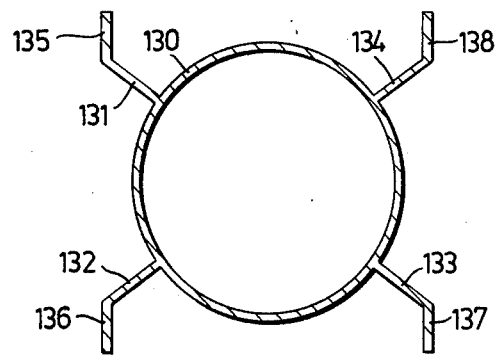
FIG. 5 is a diagrammatic sectional view through a pipe in a pipe-system.

FIG. 5 shows in profile a pipe which can be used for constructing a pipe-system according to FIGS. 1 – 4. It will be readily understood that it is not necessary to use a pipe of the illustrated profile, but that pipes having other profiles can be used. An important feature is that the pipes which are used are sufficiently resistant to corrosion and are capable of withstanding the mechanical stresses and strains to which they are subjected.

The pipe shown in FIG. 5 has a circular pipe wall 130 from which there extend four flanges. Each flange has a radially and outwardly extending portion 131 – 134, respectively, and an angled portion 135–138, respectively. The flanges are pairwise substantially identical and the portion 131 is located diametrically opposite the portion 133, while the portion 132 is located diametrically opposite the portion 134. The corresponding long sides or edges of the portion 135 and 136 are conveniently located in the same plane as the corresponding long sides or edges of the portions 137 and 138. The flanges are manufactured integrally with the wall of the pipe and are arranged to reinforce the pipe against bending forces and to provide attachment points for the holding means.

FIG. 6 is a sectional view of a pipe-coupling device and shows two parallel pipes coupled together by said coupling device. It will readily be perceived that the pipe-coupling device need not have the form shown in FIG. 6, but that other forms of pipe-coupling devices suitable for pivotally joining two pipes together can be used in the construction of the pipe-systems according to FIGS. 1-4.

In the illustrated embodiment, the pipe-coupling device has two housing portions 141 and 142 which are arranged for rotation relative to each other about a shaft 143. The shaft is fixed or journaled in the housing portions by means of screws, bearings or the like of conventional design. These devices are not described in detail, but are designated in FIG. 6 by the general reference 144. To provide for the pivotal movement of the housing portions in relation to each other, each housing portion is provided with a circular groove, the two semi-circular grooves of the housing portions are positioned so that they are facing each other. Arranged in the circle formed by the two grooves is a bearing means 145 of conventional design. Sealing of the area between the housing portions is effected by providing one of the housing portions, such as the housing portion 141, with a sealing means which may have the form of an O-ring. To facilitate connection of the pipe 112, the housing portions 141 and 142 are provided with conically chamfered portions 147 and 148, respectively. At their point of connection with the pipe-coupling means, the pipes 112 are flared conically and are fitted externally onto the conically chamfered portions 147 and 148, respectively. For securing the pipes to the housing portions there is provided ring-shaped retaining members 149 on the outside of the pipes 112 at their flared portions. When desired, the members 149 can be fixedly secured in relation to respective housing portions in a manner not shown. As will be understood, other means of connecting the pipes to the pipe-coupling means can be used instead of those shown, such as, for example screw-thread joints.

In order to join the two pipe-systems shown in FIGS. 1 – 4 together, it is necessary to provide a plurality of holding means. With the embodiments of FIGS. 3 – 4, these holding means are arranged to cooperate with each alternate pipe-coupling device. In accordance with one conceivable modification to this embodiment, the holding means may comprise simply a conventional device capable of holding the shafts 143 of respective pipe-coupling devices in spaced apart relationship. In this case, the shafts 143 are conveniently longer and or larger dimensions than those shown in the FIG. 6 embodiment.

Optionally, the holding means may be produced integrally with one or more of the securing or bearing devices 144, preferably the one shown lowermost in FIG. 6.

In the embodiment of FIGS. 1 – 2, the holding means are not used in conjunction with the pipe-coupling devices, but are arranged at the points of intersection of the pipes 112 and 122. FIG. 7 is a sectional view of a holding means suitable for this embodiment. Although not so in practice, the pipes 112 and 122 have been shown to extend parallel to each other for the sake of simplicity. Naturally, it is conceivable that other holding means can be used than those shown in FIG. 7.

The holding means in FIG. 7 comprise two substantially identical parts 151 and 152. The part 151 is attached by screws 153 to a flange of a pipe 112. The other part 152 is attached by screws to the pipe 122. For the sake of clarity only one screw 153 and one screw 154 of each part is shown, although a plurality of screws can be suitably used. The screws 153 and 154 are also used to secure fixing bands or disks 155 and 156 to the flanges. The purpose of the bands or disks, among other things, is to fix the relative positions of the flanges in the area around the holding means. The two parts 151 and 152 are mounted for rotation in relation to each other by means of conventional screw-connections 157, 158 and a bearing 159. In this way, the pipe 112 and 122 may also rotate relative to each other around a shaft through the screw-connection 157, 158.

So that the system of pipes shown in FIGS. 1 to 4 is not dragged on the ground when being extended and collapsed, thereby causing damage to growing plants and the like and, also, producing high-frictional resistance to the extending and collapsing movement, some form of support means must be provided to space the pipe-systems above the surface of the ground. In accordance with the third embodiment of the invention, a supporting means is provided for supporting the pipe-systems at either of the holding means or at a certain number of said holding means. This positioning of the supporting means affords considerable advantages, in combination with certain embodiments of the holding means. If it is assumed that the second water-supply means of the pipe-systems moves relative to the first water-supply means along a straight line through these means, it is only those holding means with adjacent pipe-portions which move along a straight line parallel to the line through the water-supply means. The supporting means may comprise leg-like structures provided with wheels, caterpillar treads or the like which engage the surface of the ground.

Figure 8:
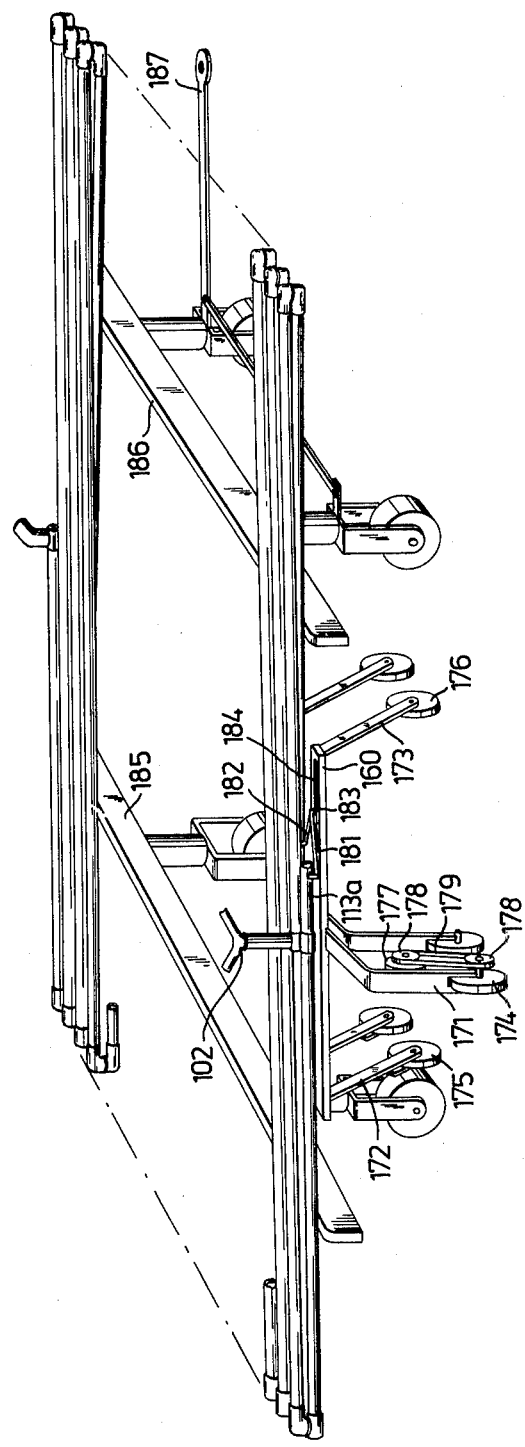
FIG. 8 is a diagrammatic view in perspective of two pipe-systems provided with supporting means and pipe-system movement means.

FIG. 8 is a diagrammatic perspective view of two pipe-systems according to the embodiments shown in FIGS. 1 – 2 including the supporting means. Although not clearly shown in FIG. 8, the pipe-systems are supported at each alternate holding means. For the sake of clarity FIG. 8 does not show all the pipes, and shows only two, substantially identical supporting means.

As will be readily perceived, it is possible to use different supporting means for different portions of the pipe-systems. With the illustrated embodiment, each supporting means comprises a beam 160 having three legs 171, 172 and 173. One of the legs is directed forwardly and downwardly, while two legs 172 and 173 are directed rearwardly and downwardly as seen in the figure. Mounted on each leg is a wheel 174, 175 and 176 respectively. The wheel 174 on the forwardly extending leg 171 is driven by a propelling means 177 via two wheels or pulleys and a belt-chain or the like 179.

The propelling means is operated by the pressure of the water flowing through the pipe-systems and may, for example, comprise a conventional piston-cylinder arrangement or a turbine arrangement. It is important that the direction in which the wheel is driven can be changed, preferably automatically, so that the water-spray 102 can be caused to move reciprocatingly along a straight line passing through the first water-supply means.

In FIG. 8 the propelling means is shown only on one supporting means. In principle it is conceivable to provide a drive only on certain wheels 174 or on all of said wheels. It should be noted that when more than one wheel is driven the wheels will rotate at different speeds as the pipe-systems are extended or collapsed.

Instead of the wheel 174, a caterpillar tread of known design may be used, and instead of wheels 175 and 176 the legs may be provided with runners.

FIG. 7 illustrates how the beam 160 can be pivotally attached to a pipe 122 in the vicinity of a holding means. The beam 160, with the flanges 165 and 166, is attached to a portion 162 in the same manner as portion 152 is attached to the pipe 122. In turn, the portion 162 is pivotally mounted relative to the portion 161, in the same manner as the portion 152 is pivotally mounted in relation to the portion 151.

To prevent the beam 161 from rotating to a line passing through the water-supply means, there is provided a link system 181, 182. Compared with the embodiment of FIGS. 1 - 2, the pipe 113 of the embodiment shown in FIG. 8 is extended by a portion 113a which extends beyond the water-spray 102. One end of the line 181 is pivotally attached to the end of the pipe portion 113a, while the end of the link 182 is pivotally attached to a corresponding point on the pipe 123. Pivotally attached to the other ends of respective links is a runner 183 which is arranged to run in a groove 184 which may be disposed in the beams 160 or in a portion located on and secured to the upper sides of the beam 160. When the pipe-systems are extended or collapsed, the runner moves in the groove and holds the beam 160 substantially perpendicular to a line passing through the water-supply means.

It will readily be understood that other known arrangements may be used for maintaining the desired orientation of the beams 160 instead of the link system, the runner and the groove of the illustrated embodiment.

With the embodiment of the pipe-systems according to FIGS. 3 and 4, the beams 160 cannot be attached to the pipes in the manner shown in FIGS. 7 - 8. The actual beams with legs and wheels and optionally provided with propelling means may be identical or similar to the structure shown in FIG. 8. But the attachment of the beam may be through a pivotted arrangement about the shaft 143 as shown in FIG. 6. The beam may either be attached directly around the shaft or in some other way, for example to the lowermost portion of a cooperating pipe-coupling device 144. The link system with the runner and groove may also be substantially of the same type as that described with reference to the embodiment of FIG. 8.

Instead of the pipe-system moving means having the form of driven wheels or caterpiller treads, other means may be used for moving the water-spray and the second water-supply means relative to the first water-supply means. For example, a line system may be used. The line system may be constructed so that the force created in said system upon extending the pipe-systems, forces certain pipe-coupling devices of one pipe-system towards opposite pipe-coupling devices in the second system. When collapsing the pipe-system, the line system simply draws one end of the pipe-system towards the other. The force may be created in the line system by means driven by the pressure of the water in the pipe-system.

For transporting the pipe-systems from one area to be watered to another area, the embodiment according to FIG. 8 is provided with two beams 185 and 186 which are carried on wheels and one of which is provided with a towing hook 187.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An apparatus for conducting water from a water source to a water-consumer which is movable over a surface in relation to the water source and which comprises:
   a. two substantially identical, extendible and collapsible pipe-systems each of which has a plurality of substantially rigid pipes and a plurality of pipe-coupling devices, said pipe-coupling devices being arranged to pivotally connect the ends of the pipes together so that water may flow from pipe to pipe through the pipe-coupling devices;
   b. a plurality of holding means each arranged to hold a specific portion of a pipe in one pipe-system in a pivotally spaced apart relationship to a corresponding portion of a pipe in the other pipe-system, said distance being small in relation to the lengths of the pipes;
   c. first water-supply means adapted to supply water from the water source to a pipe at one end of a respective pipe-system;
   d. second water-supply means effective to pass water from a pipe at the other end of respective pipe-systems to the water-consumer;
   e. a plurality of supporting means each arranged for carrying the pipe-systems above the surface at a holding means and comprising structures for engaging the surface; and
   f. each of said holding means is arranged at each alternate pipe-coupling device of respective pipe-systems, said holding means being adapted to hold a pipe-coupling device of one pipe-system spaced at a distance from a corresponding pipe-coupling device of the other pipe-system, said distance being of the same magnitude as the cross-sectional dimensions of the pipes.

2. Apparatus according to claim 1 comprising means for moving the second water-supply means relative to the first water-supply means during synchronous extension and collapsing of the two pipe-systems.

3. An apparatus for conducting water from a water source to a water-consumer which is movable over a surface in relation to the water source and which comprises:
   a. two substantially identical, extendible and collapsible pipe-systems each of which has a plurality of substantially rigid pipes and a plurality of pipe-coupling devices, said pipe-coupling devices being arranged to pivotally connect the ends of the pipes together so that water may flow from pipe to pipe through the pipe-coupling devices;
   b. said pipe-coupling devices include an upper housing portion and a lower housing portion arranged for rotation relative to each other about a shaft, said upper and lower housing portions space the plurality of rigid pipes on two planes so as to permit convenient storage of the water conducting apparatus with the rigid pipes stored in an overlapping arrangement;
   c. a plurality of holding means each arranged to hold a specific portion of a pipe in one pipe-system in a pivotally spaced apart relationship to a corresponding portion of a pipe in the other pipe-system, said distance being small in relation to the lengths of the pipes;
   d. first water-supply means adapted to supply water from the water source to a pipe at one end of a respective pipe-system;
   e. second water-supply means effective to pass water from a pipe at the other end of respective pipe-systems to the water-consumer;
   f. a plurality of supporting means each arranged for carrying the pipe-systems above the surface at a holding means and comprising structures for engaging the surface; and
   g. each of said holding means is arranged at each alternate pipe-coupling device of respective pipe-systems, said holding means being adapted to hold a pipe-coupling device of one pipe-system spaced at a distance from a corresponding pipe-coupling device of the other pipe-system, said distance being of the same magnitude as the cross-sectional dimensions of the pipes.

4. An apparatus for conducting water according to claim 3, wherein the upper and lower housings each includes a semi-circular groove which mate with each other so as to provide an opening for a bearing member and at least one of said upper and lower housing portions includes a seal.

* * * * *